(12) United States Patent
Suzuki

(10) Patent No.: US 7,072,135 B2
(45) Date of Patent: Jul. 4, 2006

(54) DISK APPARATUS, HEAD RETRACTING METHOD AND HEAD ACTUATOR CONTROL CIRCUIT

(75) Inventor: Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 10/694,742

(22) Filed: Oct. 29, 2003

(65) Prior Publication Data

US 2004/0080858 A1    Apr. 29, 2004

(30) Foreign Application Priority Data

Nov. 12, 2002   (JP) ............................... 2002-328632

(51) Int. Cl.
*G11B 21/02*   (2006.01)

(52) U.S. Cl. ....................................................... 360/75

(58) Field of Classification Search ................. 360/75, 360/78.06
See application file for complete search history.

(56) References Cited

U.S. PATENT DOCUMENTS

| 6,140,784 A * | 10/2000 | Mazda ....................... 318/280 |
| 6,169,382 B1 * | 1/2001 | McKenzie et al. .......... 318/561 |
| 6,850,382 B1 * | 2/2005 | Fayeulle et al. .............. 360/75 |

FOREIGN PATENT DOCUMENTS

JP          5-54573          3/1993

* cited by examiner

*Primary Examiner*—Andrew L. Sniezek
(74) *Attorney, Agent, or Firm*—Armstrong, Kratz, Quintos, Hanson & Brooks, LLP

(57) ABSTRACT

A head retracting method retracts a head to a retract position which is different from a disk to perform a stable unload operation when a power supply failure occurs, regardless the position and the velocity of the head. When the power supply failure occurs, controller controls that the head reaches the inner stopper, which is at a predetermined position in an opposite direction from the ramp, so as to stop at the inner stopper at a predetermined position without receiving impact shock, regardless of what position the head is and regardless of what velocity the head is moving. The head is unloaded from the predetermined position by constant voltage driving, so the head contacts the ramp and climbs onto the ramp at a predetermined velocity.

19 Claims, 11 Drawing Sheets

PRIOR ART

DISK APPARATUS, HEAD RETRACTING METHOD AND HEAD ACTUATOR CONTROL CIRCUIT

CROSS-REFERENCE TO RELATED APPLICATIONS

This application is based upon and claims the benefit of priority from the prior Japanese Patent Application No. 2002-328632, filed on Nov. 12, 2002, the entire contents of which are incorporated herein by reference.

BACKGROUND OF THE INVENTION

1. Field of the Invention

The present invention relates to a disk apparatus, a head retracting method and a head actuator control circuit for retracting the head for reading/writing a disk to a retract position when a power supply failure occurs.

2. Description of the Related Art

In a magnetic disk drive, a magnetic medium (magnetic disk) is rotated by a spindle motor during operation, where the head is floating on the magnetic medium. If a power supply failure occurs in this state, the head retracting operation is executed. When a power supply failure occurs, power from the power supply to the driver of the VCM for moving the head is stopped, so the energy for retracting the head to be used must be other than that of the power supply.

An example of energy other than the power supply is using the rotation energy of the spindle motor as power to drive the VCM and to retract the head (SPM BEMF rectification), or retract power in a storage battery including a capacitor when power is ON, and driving the VCM and retracting the head using this when the power is shut off.

The former method is a mainstream method that is often used at present. The latter method, which uses not the rotation energy of the spindle motor but electrically converted energy, is used for a disk apparatus which uses a small medium where energy to be stored in the spindle motor is not sufficient.

However the floating height of the head is becoming lower each year as the recording density of disks increases. This is making it difficult to implement both the surface roughness of the CSS (Contact Start Stop) zone to prevent the absorption of the medium and slider, required for the CSS system which is a conventional mainstream system, and the floating of the head slider.

As the means of solving this problem, a head loading/unloading method is used. But for the loading/unloading method, unlike the CSS system, unload operation to climb over the ramp is required just before completely retracting the head. To stably climb over the ramp, approaching the ramp with an initial velocity and force in a predetermined range is necessary.

However, it is possible to predict when a power supply failure will occur. For example, a power supply failure occurs when following up a track in the outer zone of the disk, when following up a track in the inner zone of the disk, or when seeking toward the outer/inner zone, the position of the head and the velocity thereof at this point cannot be specified, but is in a wide range, which makes a stable head retracting (unload) operation difficult.

To solve this problem, the head retracting method shown in FIG. 17 to FIG. 19 has been proposed (e.g. Japanese Patent Application Laid-Open No. H5-54573 (especially, pages 3–4 and FIG. 2)). As FIG. 17 shows, the magnetic disk drive 100 moves the arm 108 including the head using the VCM (Voice Coil Motor) 110 in the radius direction of the magnetic disk 102 which is rotated by the spindle motor 104, and reads/writes the data on a desired track. The ramp (spreader) 106 is disposed at the circumference position of the magnetic disk 102, and the head arm 108 is retracted onto the ramp 106.

The power supply monitor 120 detects the power supply failure and notifies the power supply failure signal POWER SUPPLY FAILURE SIGNAL to the spindle counter electromotive force rectifier 122 and the VCM driver 124. The spindle counter electromotive force rectifier 122 generates power from the counter electromotive force of the spindle motor 104 which is inertia-rotating after the power supply failure occurred, and supplies the power to the VCM driver 124.

The VCM driver 124 supplies a constant current with one polarity (−30 mA) to the VCM 110 for a predetermined time (80 ms) using the timer 126, as shown in FIG. 18, thereby first moves the magnetic head (arm) 108 to the opposite direction (arrow a) from the spreader (ramp) 106 as shown in FIG. 19. Then as FIG. 18 shows, the VCM driver 124 supplies a constant current with opposite polarity (+30 mA) to the VCM 110 for a predetermined time, and then, as shown in FIG. 19, thereby moves the head 108 in a direction to the spreader (ramp) (arrow b) which is opposite of the first direction, to retract the head onto the spreader 106.

In this conventional method, the head is moved to a predetermined position once spending a predetermined time using the current drive function of the VCM driver as is, then the head is moved in the unload (retract) direction with a different predetermined current and predetermined time, so a stable unload operation can be expected if the variation of velocity and position of the head are within a predetermined range.

However with the method of driving the head with a constant current, the current is in proportion to the force and the force is in proportion to the acceleration, so depending on the moving velocity and the position of the head when a power supply failure occurs, it is difficult to guarantee the collision velocity of the head to the inner stop of the arm 108 when the head is driven to the direction opposite from the spreader (ramp) 106, and the head assembly may be damaged.

The velocity of approaching the spreader (ramp) 106 also disperses depending on the moving velocity and the position of the head when a power supply failure occurs, and it is possible that the arm 108 may contact the spreader 106 at high velocity and cause damage to the head assembly. Also it is difficult to design to safely retract (unload) the head with certainty at a velocity which does not cause damage to the head assembly, because dispersion depending on the disk drive is large as a result of the dispersion of external force.

SUMMARY OF THE INVENTION

With the foregoing in view, it is an object of the present invention to provide a disk apparatus, a head retracting method and a head actuator control circuit for unloading the head stably when a power supply failure occurs.

It is another object of the present invention to provide a disk apparatus, a head retracting method and a head actuator control circuit for performing a stable unload operation regardless the moving velocity and the position of the head when a power supply failure occurs.

It is still another object of the present invention to provide a disk apparatus, a head retracting method and a head actuator control circuit for controlling velocity and preventing damage to the head assembly in the head unloading operation when a power supply failure occurs.

To achieve these objects, the head retracting method of the present invention is a head retracting method for retracting a head which at least reads information for an information recorded disk to a retract position according to the power supply failure, including a first step of controlling the head to move to a predetermined position in an opposite direction from the retract position such that the velocity of the head becomes constant in the vicinity of the predetermined position, and a second step of controlling the head to move to the retract position after the head reaches the predetermined position such that the velocity of the head becomes constant around the retract position.

The disk apparatus of the present invention is a disk apparatus for retracting a head which at least reads information for an information recorded disk to a retract position according to the power supply failure, including an actuator for moving the head, and a control unit which controls the head to move to a predetermined position in an opposite direction from the retract position such that the velocity of the head becomes constant at least around the predetermined position, and controls the head to move to the retract position after the head reaches the predetermined position such that the velocity of the head becomes constant at least around the retract position.

The head actuator control circuit of the present invention is a head actuator control circuit for retracting a head which at least reads an information recorded disk to a retract position according to the power supply failure, including a power monitoring circuit for detecting the power supply failure, and an actuator control circuit which moving-controls the head to move to a predetermined position in an opposite direction from the retract position such that the velocity of the head becomes constant in the vicinity of the predetermined position, and moving-controls the head to move to the retract position after the head reaches the predetermined position such that the velocity of the head becomes constant at least around the retract position.

In this aspect of the present invention, the head reaches the inner stopper at a predetermined position in an opposite direction from the ramp at a predetermined velocity when the power supply failure occurs, so the head can stop at the inner stopper at the predetermined position without receiving a shock regardless what position the head is in or regardless what velocity the head is moving.

The head is unloaded from the predetermined position at a constant velocity, so the head contacts the ramp and climbs onto the ramp at a predetermined velocity, which prevents damage to the head which would occur when contact force becomes excessive and the head contacts the magnetic disk with the arm inclined, therefore unloading completes with certainty. Because of this, a magnetic disk apparatus with high reliability can be implemented.

In the head retracting method of the present invention, it is preferable that the above mentioned first step includes a step of controlling the movement of the head to the predetermined position in an opposite direction from the retract position by driving the actuator for moving the head using a predetermined first voltage, and the above mentioned second step includes a step of controlling the movement of the head to the retract position by driving the actuator using a predetermined second voltage which is different from the first voltage.

In the disk apparatus of the present invention, it is preferable that the control unit controls the movement of the head to a predetermined position in an opposite direction from the retract position by driving the actuator for moving the head using a predetermined first voltage, then controls the movement of the head to the retracting position by driving the actuator using a predetermined second voltage which is different from the first voltage.

In the head actuator control circuit of the present invention, it is preferable that the actuator control circuit includes a voltage mode driver, and a controller for controlling the voltage mode driver to drive the actuator for moving the head using a predetermined first voltage such that the head moves to a predetermined position in an opposite direction from the retracting position, and then to drive the actuator using a predetermined second voltage which is different from the first voltage such that the head moves to the retract position.

According to this aspect of the present invention, velocity is controlled using the counter electromotive voltage of the actuator by constant voltage driving, so the present invention can be easily implemented.

In the head retracting method of the present invention, it is preferable that the first step includes a step of controlling the movement of the head to a predetermined position in an opposite direction from the retract position according to the predetermined target velocity using a velocity signal fed back from the velocity detection unit for detecting the moving velocity of the head, and the second step includes a step of controlling the movement of the head to the retract position according to a scheduled target velocity using the velocity signal fed back from the velocity detection unit.

It is preferable that the disk apparatus of the present invention further comprises velocity detection unit for detecting the moving velocity of the head, and the control unit controls the movement of the head to a predetermined position in an opposite direction from the retract position according to the predetermined target velocity using the velocity signal fed back from the velocity detection unit, and then controls the movement of the head to the retract position according to the scheduled target velocity using the velocity signal fed back from the velocity detection unit.

In the head actuator control circuit of the present invention, it is preferable that the actuator control circuit further includes velocity detection unit for detecting the moving velocity of the head, and a controller which controls the movement of the head to a predetermined position in an opposite direction from the retract position according to the predetermined target velocity using a velocity signal fed back from the velocity detection unit, and then controls the movement of the head to the retract position according to the scheduled target velocity using the velocity signal fed back from the velocity detection unit.

According to this aspect of the present invention, the head is unloaded after controlling the velocity to the target velocity using the detected velocity of the velocity detection unit, thereby it is possible to unload the head with an accurate predetermined velocity.

It is preferable that the head retracting method of the present invention further includes a step of braking the actuator for moving the head for a predetermined time according to the power supply failure. Also in the disk apparatus of the present invention, it is preferable that the control unit brakes the actuator for moving the head for a predetermined time according to the power supply failure. Also it is preferable that the head actuator control circuit further includes a braking circuit for braking the actuator for moving the head for a predetermined time according to the power supply failure.

According to this aspect of the present invention, braking is executed when unloading starts, so the head can be unloaded stably even if the velocity of the head is great.

In the head retracting method, disk apparatus and head actuator control circuit of the present invention, it is preferable that braking is executed by shorting both ends of the coil of the actuator for moving the head for a predetermined time according to the power supply failure.

In the head retracting method, disk apparatus and head actuator control circuit of the present invention, it is preferable that the first step includes a step of controlling the movement of the head to the predetermined position in an opposite direction from the retract position by driving an actuator for moving the head for a predetermined time, and the second step includes a step of controlling the movement of the head to the retract position by driving the actuator for another predetermined time.

By this, the velocity can be controlled based on time control, and unload control of the head can be easier.

It is preferable that the head retracting method, disk apparatus and head actuator control circuit of the present invention further includes a third step of monitoring the velocity of the head after the movement control in the first step, and shifting to the second step when the velocity of the head is a predetermined velocity or less. By this, after detecting that the head has reached the predetermined position, the shift to unloading can be smooth.

DESCRIPTION OF THE PREFERRED EMBODIMENTS

Embodiments of the present invention will now be described in the sequence of the first embodiment, second embodiment, third embodiment and other embodiments, but the present invention is not limited to these embodiments.

First Embodiment

Figure 1:
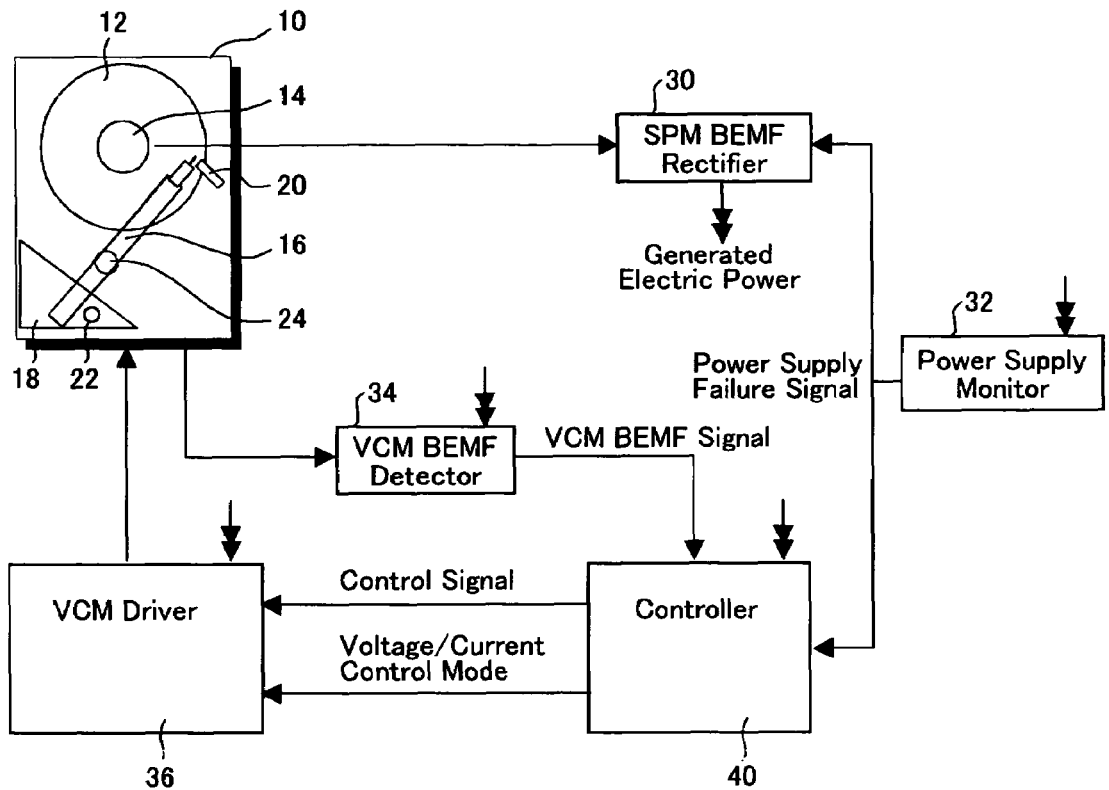
FIG. 1 is a diagram depicting the configuration of the disk apparatus according to the first embodiment of the present invention.
Figure 2:
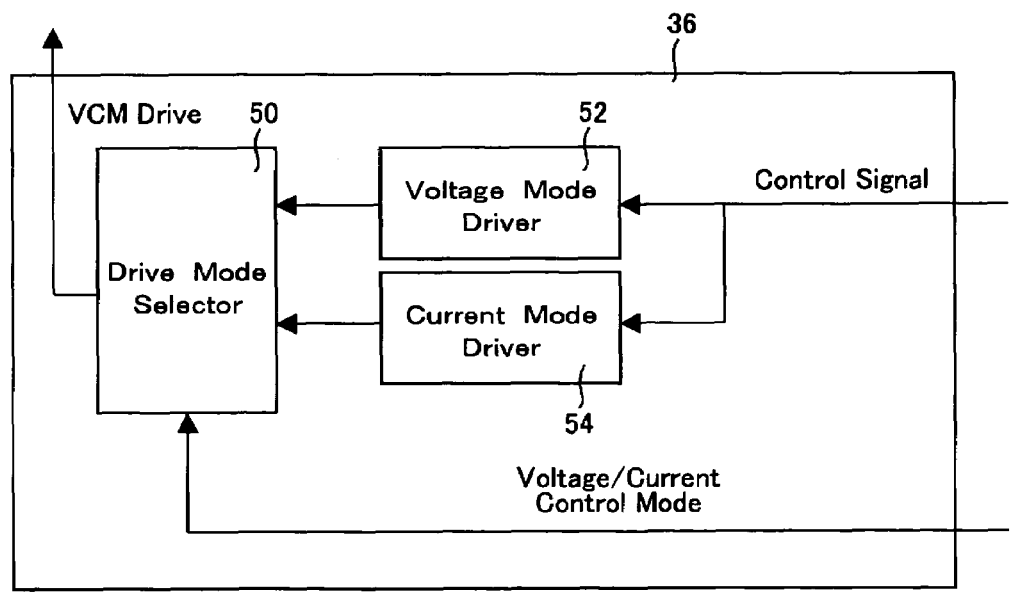
FIG. 2 is a diagram depicting the configuration of the VCM driver in FIG. 1.
Figure 3:
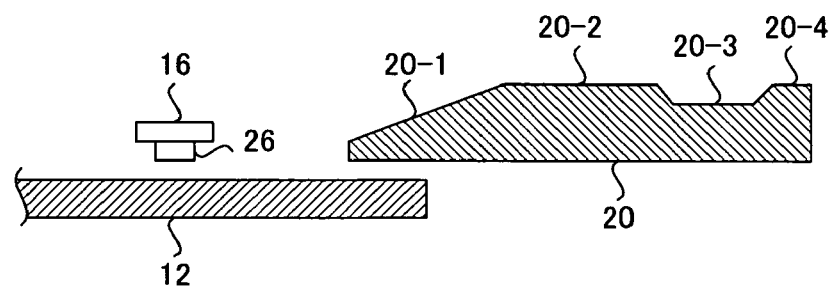
FIG. 3 is a cross-sectional view depicting the arm and ramp in FIG. 1.
Figure 4:
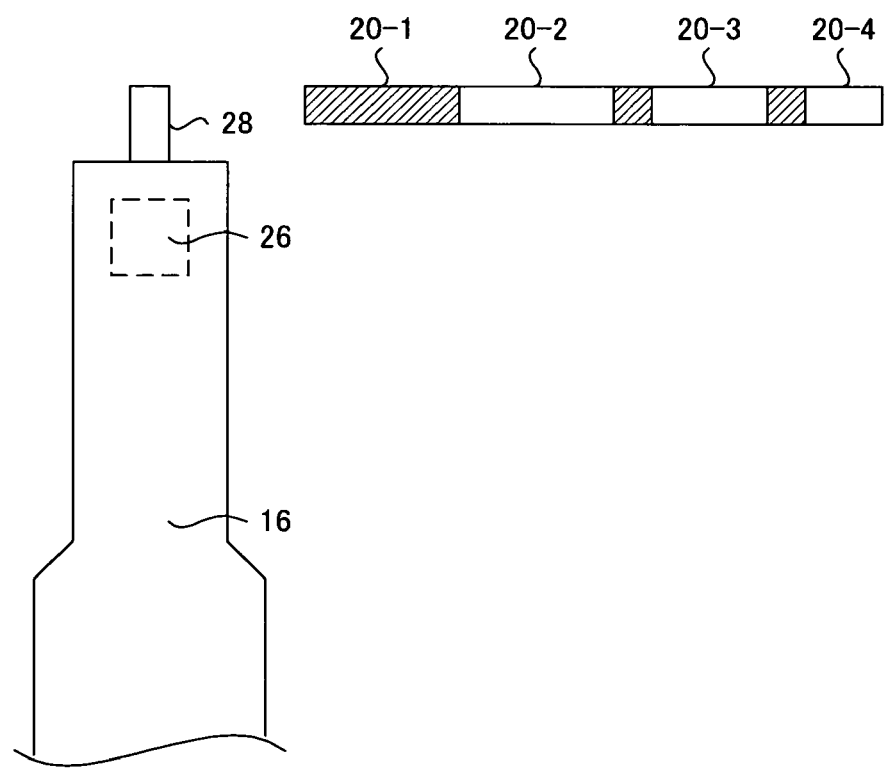
FIG. 4 is a top view depicting the arm and ramp in FIG. 1.
Figure 5:
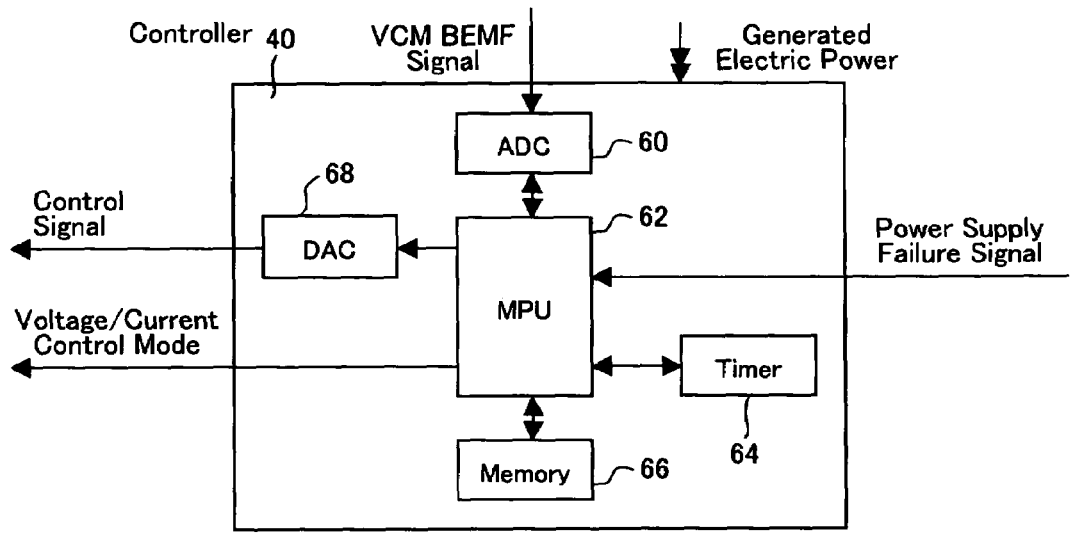
FIG. 5 is a diagram depicting the configuration of the controller in FIG. 1.

FIG. 1 is a diagram depicting the configuration of the first embodiment of the disk apparatus of the present invention, FIG. 2 is a diagram depicting the configuration of the VCM driver in FIG. 1, FIG. 3 is a cross-sectional view depicting the arm and ramp in FIG. 1, FIG. 4 is a top view depicting the arm and ramp in FIG. 3, and FIG. 5 is a diagram depicting the configuration of the controller in FIG. 1.

As FIG. 1 shows, the magnetic disk drive 10 comprises a magnetic disk 12, a spindle motor 14 for rotating the magnetic disk 12, an arm 16 which has a head slider at the tip, a VCM (Voice Coil Motor) 18 for moving the arm 16 including the head slider in the radius direction of the magnetic disk 12, and a ramp 20 which is disposed at an outer circumference position of the magnetic disk 12 and on which the arm 16 is retracted.

The VCM 18 is comprised of a fixed magnet and a drive coil which is disposed at the rear end of the arm 16. The arm 16 is comprised of a swing arm which rotates with the rotation axis 24 as the center, and an inner stopper 22, for limiting the inner circumference position of the arm 16, is disposed on the VCM 18.

The arm 16 and the ramp 20 will be described with reference to FIG. 3 and FIG. 4. The ramp 20 is comprised of a slant face 20-1 which ascends diagonally from the magnetic disk 12 side, a first flat face 20-2 which continues from the slant face 20-1, and a groove 20-3 which continues from the first flat face 20-2 to the second flat face 20-4.

At the tip of the arm 16, a lift 28 is created, and at the front part of the arm 16, a head slider 26 including the magnetic head is disposed. In the unloading (retracting) operation of the head, the lift 28 of the arm 16 climbs over the slant face 20-1 of the ramp 20 by the arm 16 moving to the right direction in FIG. 3 and FIG. 4, reaches the groove 20-3 via the first flat face 20-2, and stops at the step difference section with the second flat face. By this, the lift 28 is caught in the groove 20-3 and parks.

In the load operation of the head, on the other hand, the lift 28 climbs over the slant face of the groove 20 and the first flat face 20-2 by moving the arm 16 that parked at the groove 20-3, to the left direction in FIG. 3 and FIG. 4, and the arm 16 including the head returns onto the magnetic disk 12 by the lift 28 sliding down along the slant face 20-1.

In FIG. 1, the power supply monitor circuit 32 monitors the power supply, and when it detects a power supply failure, the power supply monitor circuit 32 notifies the power supply failure signal POWER SUPPLY FAILURE SIGNAL to the spindle counter electromotive force rectifier 30 and the controller 40. The spindle counter electromotive force rectifier 30 generates power from the counter electromotive force of the spindle motor 14 which inertia-rotates after a power supply failure occurs, and supplies the power to the power supply monitor circuit 32, VCM counter electromotive force detector 34, controller 40 and VCM driver 36.

The VCM counter electromotive force detector 34 detects the counter electromotive force in proportion to the velocity from the coil of the VCM 18, and outputs it to the controller 40. The controller 40 normally performs seek control and track following control. When the power supply failure signal POWER SUPPLY FAILURE SIGNAL is received, the controller 40 performs the later mentioned head unload processing.

The VCM driver 36 drives the VCM 18 according to the instructions of the controller 40. The VCM driver 36 comprises a voltage mode driver 52 and a drive mode selector 50, in addition to the current mode driver 54, as shown in FIG. 2. The current mode driver 54 and the voltage mode driver 52 output current and voltage according to the control signal (Control Signal) of the controller 40.

The drive mode selector 50 connects either the current mode driver 54 or the voltage mode driver 52 to the VCM 18 depending on the voltage/current control mode of the controller 40. In normal seek control and track following control, the VCM 18 is driven by current using the current mode driver 54.

As FIG. 5 shows, the controller 40 is comprised of an AD converter 60 which converts an analog VCM counter electromotive force signal into a digital value, an MPU (Micro Processor Unit) 62, a timer 64, a DA converter 68 which converts a digital control signal of the MPU 62 into an analog control signal, and a memory 66 which stores the programs and data of the MPU 62.

Figure 6:
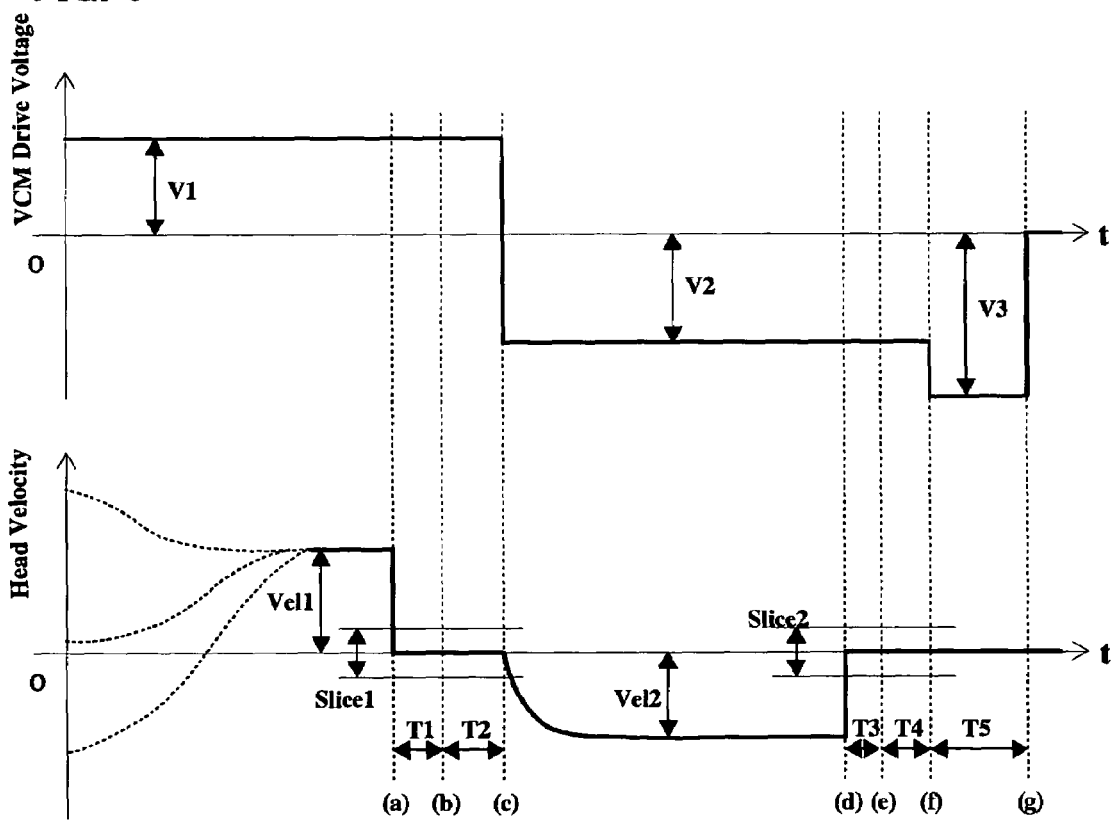
FIG. 6 is a time chart of the first embodiment of the present invention.
Figure 7:
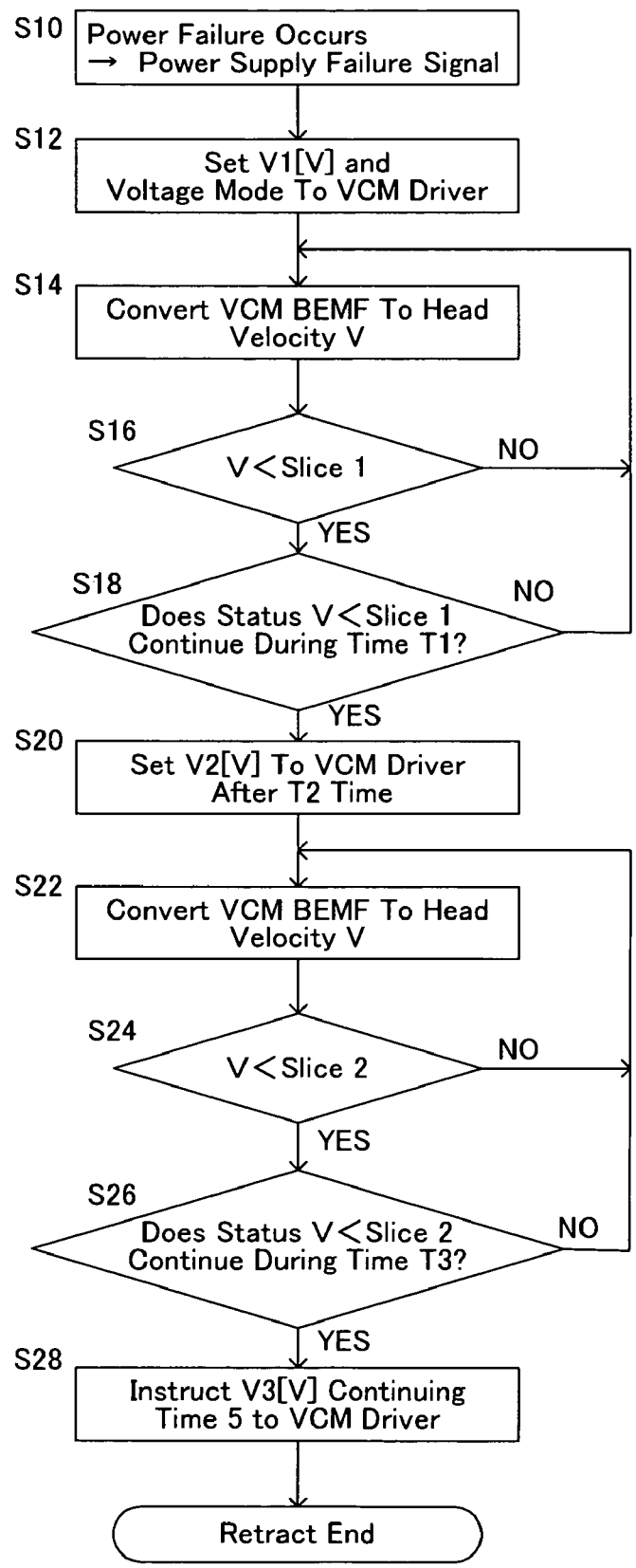
FIG. 7 is a flow chart depicting the unload processing of the first embodiment of the present invention.
Figure 8:
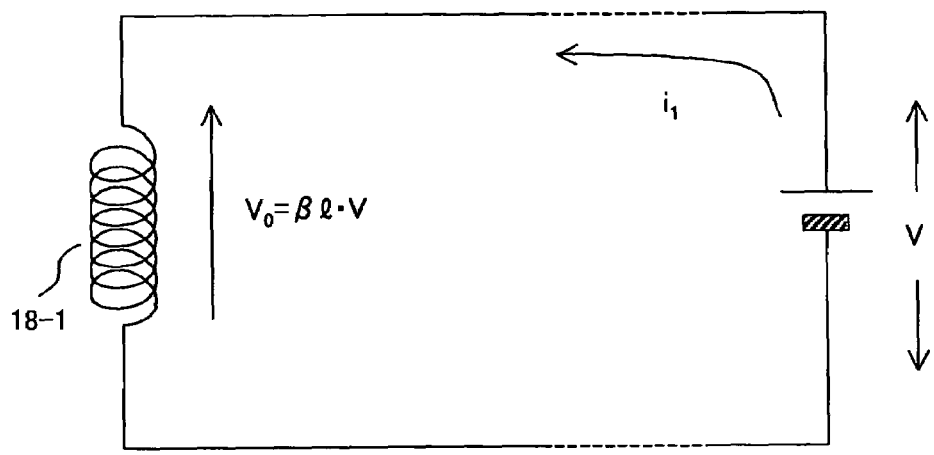
FIG. 8 is a diagram depicting the velocity control of the first embodiment of the present invention.

Now unload processing, which the MPU 62 executes when a power supply failure occurs, will be described with reference to FIG. 6 to FIG. 8. FIG. 6 is a time chart of the VCM drive voltage and the in-plane moving velocity of the head according to the first embodiment of the present invention, FIG. 7 is a flow chart depicting the unload processing when a power supply failure occurs, and FIG. 8 is a diagram depicting the unload operation in FIG. 7.

The unload operation when a power supply failure occurs will be described according to FIG. 7 with reference to FIG. 6 and FIG. 8. In FIG. 6, time before the power supply failure is the time before "0", which is not included in the chart, and it is assumed that the power supply failure occurred at time "0" in FIG. 6.

(S10) When a power supply failure is detected, the power supply monitor circuit 32 notifies the power supply failure signal POWER SUPPLY FAILURE SIGNAL to the spindle counter electromotive force rectifier 30 and the controller 40. Receiving this notice, the spindle counter electromotive force rectifier 30 supplies the power generated using the spindle motor 14 as a generator to the power supply monitor circuit 32, VCM counter electromotive force detector 34, controller 40 and VCM driver 36.

(S12) The MPU 62 of the controller 40 sets V1 [Volts] for the control signal and sets the voltage/current control mode Voltage/Current Control Mode to voltage mode, and sends both of these signals to the VCM driver 36. By this, the VCM driver 36 starts driving the VCM 18 with the voltage of V1 volts in the voltage mode from time "0" in FIG. 6.

In other words, the digital control value V1 of the MPU 62 is converted into an analog value by the DA converter 68, is input to the voltage mode driver 52 and the current mode driver 54 of the VCM driver 36, and the voltage mode signal of the MPU 62 is input to the drive mode selector 50 of the VCM driver 36. The drive mode selector 50 has three inputs, and is comprised of two output terminal selectors, so the voltage of V1 volts of the voltage mode driver 52 is applied to both ends of the coil of the VCM 18 connected to the two output terminals.

By this constant voltage drive, the velocity of the head (arm) 16 changes as shown by the dotted lines depending on the head position and the velocity when the power supply failure occurs, and eventually converges to the velocity Vel1. In FIG. 8, when the arm 16 is moving at velocity v, the counter electromotive voltage V0 (=B1*v), which is in proportion to the velocity v, is generated to the coil 18-1 of the VCM 18.

When constant voltage V is applied to the coil 18-1 of the VCM 18, the current i1 does not flow through the coil 18-1 if V=V0. If V>V0, the current i1 flows through the coil 18-1. In other words, if the velocity of the arm 16 is fast, the drive current does not flow, so the velocity of the arm 16 decreases, and if the velocity of the arm 16 is slow, on the other hand, the drive current flows and the arm 16 accelerates.

Therefore when the arm 16 is driven with the constant voltage of the voltage V1, the velocity of the arm 16 converges to the velocity Vel1 defined by the voltage V1, regardless of the velocity and the position of the arm 16. In other words, regardless of the velocity and the position of the arm 16, the head (arm) 16 is driven to the inner side (opposite direction from the ramp) of the magnetic disk 12, and collides with the inner stopper 22 at velocity Vel1.

(S14) The MPU 62 of the controller 40 reads the counter electromotive voltage signal VCM BEMF from the VCM counter electromotive voltage detector 34 using the AD converter 60 based on the time 'a' counted by the timer 64, and converts it into the head velocity v based on the above mentioned relationship. The time 'a' is defined to be the time when the head (arm) 16 is expected to collide with the inner stopper 22 after the constant voltage driving with the voltage V1 is started, no matter where the head is positioned on the magnetic disk.

(S16) The MPU 62 of the controller 40 compares the converted velocity v with a predetermined slice value Slice 1 (see FIG. 6). If the converted velocity v is not the slice value Slice 1 or less, the head (arm) 16 has not yet stopped by colliding with the inner stopper 22, so processing returns to step S14.

(S18) If the converted velocity v is the slice value Slice 1 or less, on the other hand, the MPU 62 of the controller 40 judges whether the converted velocity v is at the slice value Slice 1 or less during a predetermined time T1. If the converted velocity v is not at the slice value Slice 1 or less during the predetermined time T1, processing returns to step S14.

(S20) If the converted velocity v is at the slice value Slice 1 or less during the predetermined time T1, it is judged that the arm collided and stopped, and after waiting for the time T2 (see FIG. 6) for confirmation, the control signal Control Signal is updated to the voltage V2 [Volts] after the time T2 is elapsed (see times (a)→(b)→(c) in FIG. 6). This voltage V2 has an opposite polarity from the voltage V1, so the head (arm) 16 starts operating in the retracting direction (direction toward the ramp), and the velocity eventually converges to the velocity Vel2. As described with FIG. 8, the velocity changes during times (c) to (d) in FIG. 6, and converges to velocity Vel2 by the constant voltage drive. This converged velocity Vel2 is a velocity with which the counter electromotive voltage of the VCM 18 and the drive voltage V2 are balanced. With this velocity, the head climbs over the ramp 20 and is unloaded.

(S22) The MPU 62 of the controller 40 reads the counter electromotive voltage signal VCM BEMF from the VCM counter electromotive voltage detector 34 using the AD converter 60 based on the time 'd' counted by the timer 64, and converts it into the head velocity v based on the above mentioned relationship. This time 'd' is defined to be the time when the head is expected to climb over the ramp 20 from the inner stopper 22 after constant voltage driving with voltage V2 started.

(S24) The MPU 62 of the controller 40 compares the converted velocity v with a predetermined slice value Slice 2 (see FIG. 6). If the converted velocity v is not at the slice value Slice 2 or less, the lift 28 of the head (arm) 16 is not caught in the groove 20-3 of the ramp 20 and is not stopped, so processing returns to step S22.

(S26) if the converted velocity v is at the slice value Slice 2 or less, on the other hand, the MPU 62 of the controller 40 judges whether the converted velocity v is at the slice value Slice 2 or less during a predetermined time T3. If the converted velocity v is not at the slice value Slice 2 or less during the predetermined time T3, processing returns to step S22.

(S28) If the converted velocity v is at the slice value Slice 2 or less during the predetermined time T3, the MPU 62 judges that the head is caught in the groove 20-3 of the ramp 20 and is stopped, waits for the time T4 (see FIG. 6) for confirmation, and updates the control signal Control Signal to the voltage V3 (Volts) after the time T4 elapsed (see times (d)→(e)→(f) in FIG. 6). Because this voltage V3 has opposite polarity from the voltage V1 and is greater than the voltage V2, the lift 20-3 of the head (arm) 16 is pressed against the second flat face 20-4 of the groove 20-3 of the ramp 20, and the head is retracted completely. The time of applying the voltage V3 is T5, and by this, the parking position of the groove 20-3 of the lift 28 becomes constant. Therefore retracting processing is completed.

In this way, after the power supply failure is detected, the head 16 is moved in an opposite direction from the ramp 20 by constant voltage driving. With constant voltage driving, the head is moved to a position opposite from the ramp 20 with a predetermined velocity with which BEMF of the VCM 18 and the drive voltage are perfectly balanced. When the head reaches the predetermined position (inner stopper), the head contacts against the stopper and the head velocity becomes almost "0". So by detecting the state where the head velocity is close to "0", the reaching of the head to the predetermined position is detected, and the head is unloaded by constant voltage driving in the ramp 20 direction. The head climbs over the ramp with a predetermined velocity with which the BEMF of the VCM and the drive voltage are perfectly balanced.

In this way, the head 16 reaches the inner stopper at a predetermined position in an opposite direction from the ramp 20 at a predetermined velocity when the power supply failure occurs, so the head can stop at the inner stopper at the predetermined position without shock, regardless of what position the head is in or regardless of what velocity the head is moving. The head is unloaded from the predetermined position at a constant velocity, so the head contacts the ramp and climbs onto the ramp at a predetermined velocity, which prevents damage to the head which would occur when contact force becomes excessive and the head contacts the magnetic disk with the arm inclined, therefore unloading completes with certainty. Because of this, a magnetic disk apparatus with high reliability can be implemented.

If necessary, retracting of the head may be detected by the BEMF of the VCM. By this the unload operation can be confirmed.

In the above mentioned example, an example where the present invention is implemented by firmware of the controller 40 was described, but hardware for executing the above mentioned steps may be constructed.

Second Embodiment

Figure 9:
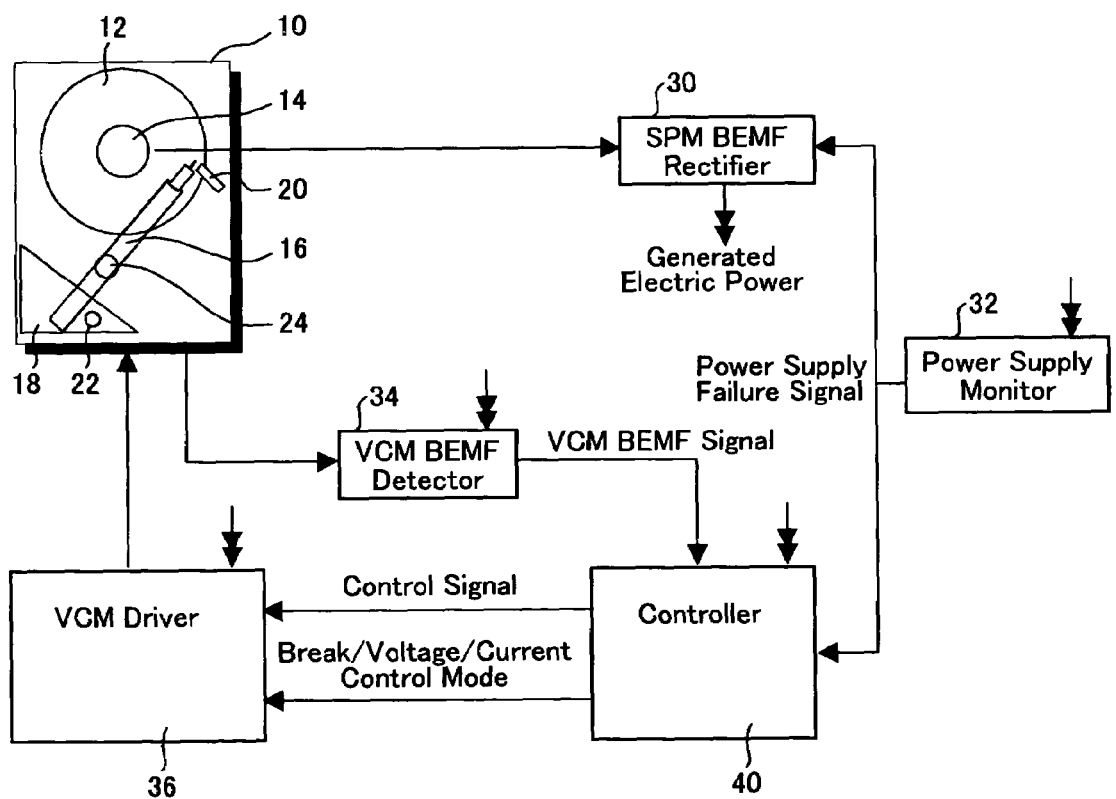
FIG. 9 is a diagram depicting the configuration of the disk apparatus according to the second embodiment of the present invention.
Figure 10:
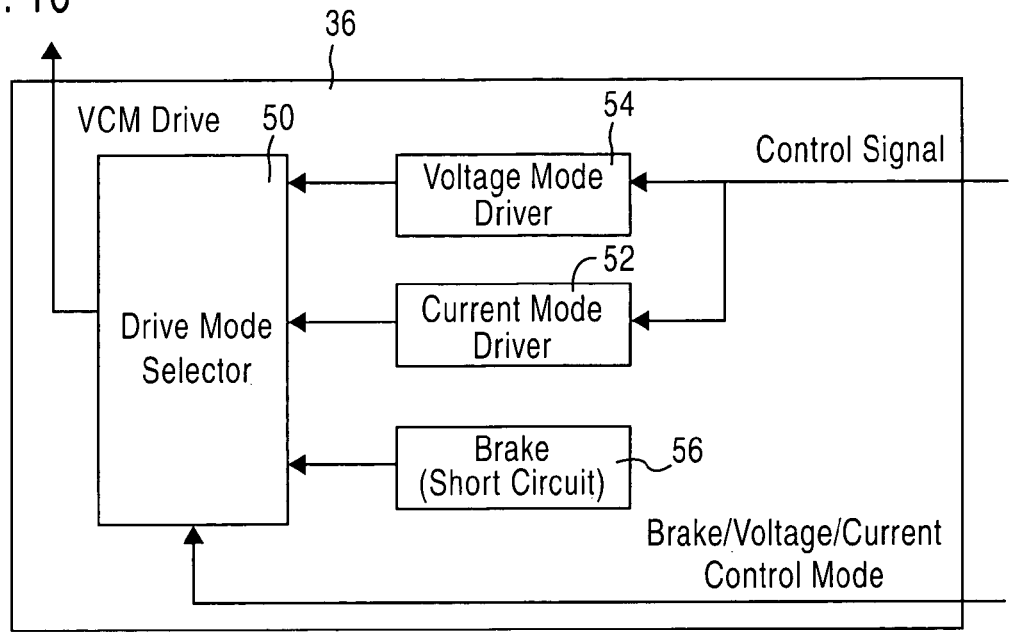
FIG. 10 is a diagram depicting the configuration of the VCM driver in FIG. 9.

FIG. 9 is a diagram depicting the configuration of the second embodiment of the magnetic disk drive of the present invention, and FIG. 10 is a diagram depicting the configuration of the VCM driver in FIG. 9.

In FIG. 9 and FIG. 10, components identical with those in FIG. 1 are denoted with identical reference numerals. In other words, as FIG. 9 shows, the magnetic disk drive 10 comprises a magnetic disk 12, a spindle motor 14 for rotating the magnetic disk 12, an arm 16 which has a head slider at the tip, a VCM (Voice Coil Motor) 18 for moving the arm 16 including the head slider in the radius direction of the magnetic disk 12, and a ramp 20 which is disposed at an outer circumference position of the magnetic disk 12 and on which the arm 16 is retracted.

The VCM 18 is comprised of a fixed magnet and a drive coil which is disposed at the rear end of the arm 16. The arm 16 is comprised of a swing arm which rotates around the rotation axis 24 as the center, and the inner stopper 22 for limiting the inner circumference position of the arm 16 is disposed on the VCM 18. The configuration of the arm 16 and the ramp 20 are the same as those shown in FIG. 3 and FIG. 4.

The power supply monitor circuit 32 monitors the power supply, and when a power supply failure is detected, the power supply monitor circuit 32 notifies the power supply failure signal POWER SUPPLY FAILURE SIGNAL to the spindle counter electromotive force rectifier 30 and the controller 40. The spindle counter electromotive force rectifier 30 generates power from the counter electromotive force of the spindle motor 14 which inertia-rotates after the power supply failure occurs, and supplies the power to the power supply monitor circuit 32, VCM counter electromotive force detector 34, controller 40 and VCM driver 36.

The VCM counter electromotive force detector 34 detects the counter electromotive force in proportion to the velocity from the coil of the VCM 18, and outputs it to the controller 40. The controller 40 normally performs seek control and track following control. When the power supply failure signal POWER SUPPLY FAILURE SIGNAL is received, the controller 40 performs the later mentioned head unload processing.

The VCM driver 36 drives the VCM 18 according to the instructions from the controller 40. The VCM driver 36 comprises a voltage mode driver 52, a brake (short) circuit 56 and a drive mode selector 50, in addition to the current mode driver 54, as shown in FIG. 10. The current mode driver 54 and the voltage mode driver 52 output current and voltage according to the control signal (Control Signal) of the controller 40. The brake circuit 56 shorts both ends of the VCM coil 18-1 and brakes the VCM 18.

The drive mode selector 50 connects either the brake circuit 56, the current mode driver 54 or the voltage mode driver 52 to the VCM 18 depending on the brake/voltage/current control mode of the controller 40. In normal seek control and track following control, the VCM 18 is driven by current using the current mode driver 54. The configuration of the controller 40 is the same as the one shown in FIG. 5.

Figure 11:
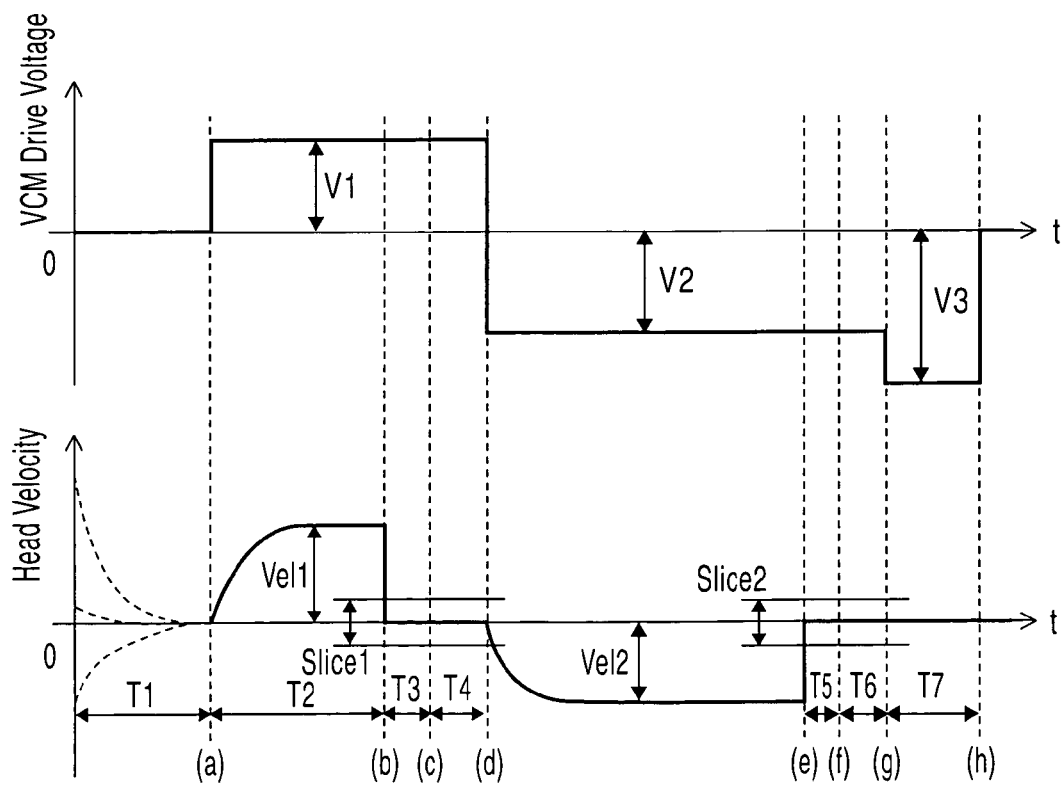
FIG. 11 is a time chart of the second embodiment of the present invention.
Figure 12:
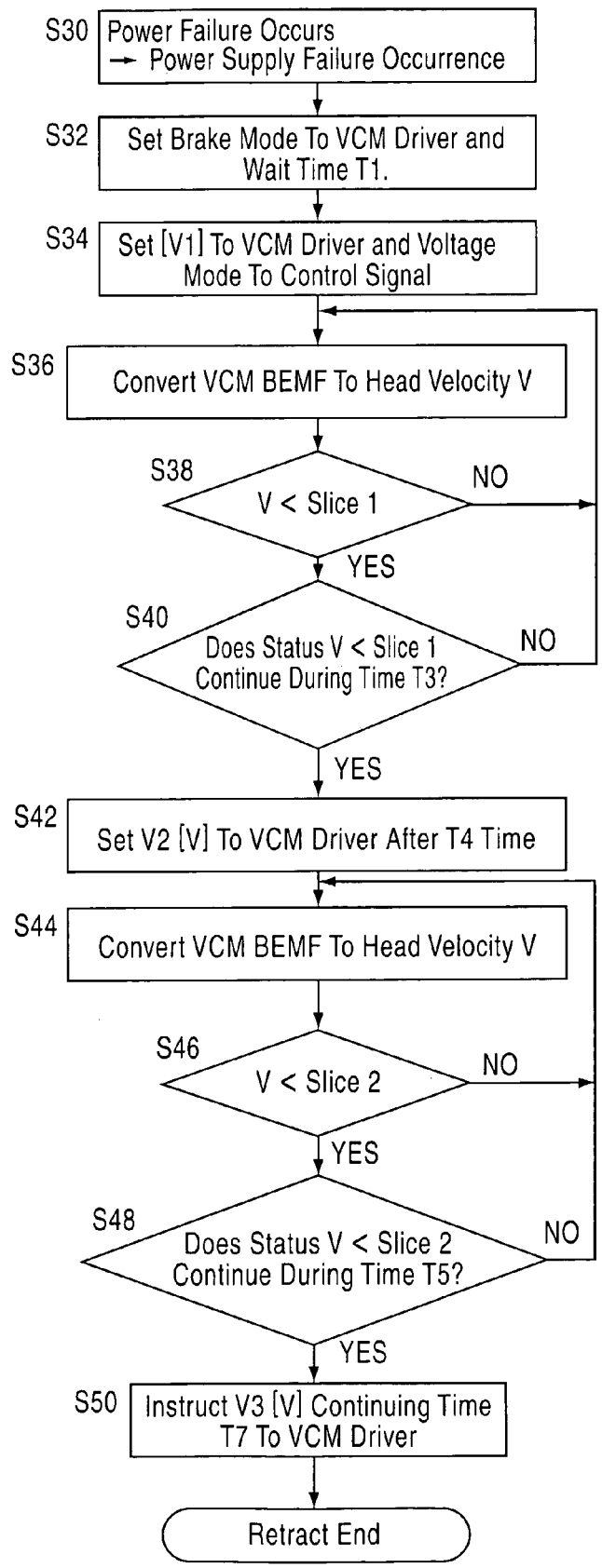
FIG. 12 is a flow chart depicting the unload processing of the second embodiment of the present invention.

Now unload processing, which the MPU 62 of the controller 40 executes when a power supply failure occurs, will be described with reference to FIG. 11 and FIG. 12. FIG. 11 is a time chart of the VCM drive voltage and the in-plane moving velocity of the head according to the second embodiment of the present invention, and FIG. 12 is a flow chart depicting unload processing when a power supply failure occurs.

Unload processing when a power supply failure occurs will be described according to FIG. 12 with reference to FIG. 11. In FIG. 11 as well, the time before a power supply failure is the time before "0", which is not included in the chart, and it is assumed that the power supply failure occurred at time "0" in FIG. 11.

(S30) When a power supply failure is detected, the power supply monitor circuit 32 notifies the power supply failure signal POWER SUPPLY FAILURE SIGNAL to the spindle counter electromotive force rectifier 30 and the controller 40. Receiving this notice, the spindle counter electromotive force rectifier 30 supplies the power generated using the spindle motor 14 as a generator to the power supply monitor circuit 32, VCM counter electromotive force detector 34, controller 40 and VCM driver 36.

(S32) The MPU 62 of the controller 40 sets the brake/voltage/current control mode Brake/Voltage/Current Control Mode to the brake mode, and sends the brake mode signal to the drive mode selector 50 of the VCM driver 36. By this, the VCM driver 36 shorts both ends of the coil 18-1 of the VCM 18 using the brake circuit 56. The short time is T1. By this, current does not flow into the coil 18-1 of the VCM 18, so as the dotted lines in FIG. 11 show, the head velocity converges to "0" in all cases indicated by the dotted lines, regardless of the head velocity when the power supply failure occurs.

(S34) The MPU 62 of the controller 40 sets V1 [Volts] for the control signal Control Signal, and sets the brake/voltage/current control mode Brake/Voltage/Current Control Mode to voltage mode, and sends both of these signals to the VCM driver 36. By this, the VCM driver 36 starts driving the VCM 18 with the voltage of V1 volts in voltage mode from the time "0" in FIG. 6.

In other words, the digital control value V1 of the MPU 62 is converted into an analog value by the DAC converter 68, is input to the voltage mode driver 52 and the current mode driver 54 of the VCM driver 36, and the voltage mode signal of the MPU 62 is input to the drive mode selector 50 of the VCM driver 36. The drive mode selector 50 has four inputs and is comprised of two output terminal selectors, so the voltage of V1 volts of the voltage mode driver 52 is applied to both ends of the coil of the VCM 18 connected to the two output terminals.

By this constant voltage drive, the velocity of the head (arm) 16 eventually converges to the velocity Vel1 from "0", regardless the head position. If the constant voltage driving is executed with voltage V1, as described in FIG. 8, the velocity of the arm 16 is converged to the velocity Vel1 defined by the voltage V1 regardless the position of the arm 16. In other words, regardless the position of the arm 16, the head (arm) 16 is driven to the inner side (opposite direction from the ramp) of the magnetic disk 12, colliding with the inner stopper 22 at the velocity Vel1.

(S36) The MPU 62 of the controller 40 reads the counter electromotive voltage signal VCM BEMF from the VCM counter electromotive voltage detector 34 using the AD converter 60 based on the time 'b' after the time T2, which is counted by the timer 64, and converts it into the head velocity v based on the above mentioned relationship. The time 'b' is defined to be the time when the head (arm) 16 is expected to collide with the inner stopper 22 after constant voltage driving with the voltage V1 is started, no matter where the head is positioned on the magnetic disk.

(S38) The MPU 62 of the controller 40 compares the converted velocity v with a predetermined slice value Slice 1 (see FIG. 11). If the converted velocity v is not the slice value Slice 1 or less, the head (arm) 16 has not yet stopped by colliding with the inner stopper 22, so processing returns to step S36.

(S40) If the converted velocity v is the slice value Slice 1 or less, on the other hand, the MPU 62 of the controller 40 judges whether the converted velocity v is at the slice value Slice 1 or less during a predetermined time T3. If the converted velocity v is not at the slice value Slice 1 or less during the predetermined time T3, processing returns to step S36.

(S42) If the converted velocity v is at the slice value Slice 1 or less during the predetermined time T3, it is judged that the arm collided and stopped, and after waiting for the time T4 (see FIG. 11) for confirmation, the control signal Control Signal is updated to the voltage V2 [Volts] after the time T4 has elapsed (see times (b)→(c)→(d) in FIG. 11). This voltage V2 has an opposite polarity from the voltage V1, so the head (arm) 16 starts operating in the retracting direction (direction to the ramp), and the velocity eventually converges to the velocity Vel2. As described with FIG. 8, the velocity changes during times (d) to (e) in FIG. 11 by constant voltage driving, and converges to the velocity Vel2. This converged velocity Vel2 is a velocity with which the counter electromotive voltage of the VCM 18 and the drive voltage V2 are balanced. With this velocity, the head climbs over the ramp 20 and is unloaded.

(S44) The MPU 62 of the controller 40 reads the counter electromotive voltage signal VCM BEMF from the VCM counter electromotive voltage detector 34 using the AD converter 60 based on the time 'e' counted by the timer 64, and converts it into the head velocity v based on the above mentioned relationship. This time 'e' is defined to be the time when the head is expected to climb over the ramp 20 from the inner stopper 22 after constant voltage driving with voltage V2 is started.

(S46) The MPU 62 of the controller 40 compares the converted velocity v with a predetermined slice value Slice 2 (see FIG. 11). If the converted velocity v is not at the slice value Slice 2 or less, the lift 28 of the head (arm) 16 is not caught in the groove 20-3 of the ramp 20 and is not stopped, so processing returns to step S44.

(S48) If the converted velocity v is at the slice value Slice 2 or less, on the other hand, the MPU 62 of the controller 40 judges whether the converted velocity v is at the slice value Slice 2 or less during a predetermined time T5. If the converted velocity v is not at the slice value Slice 2 or less during the predetermined time T5, processing returns to step S44.

(S50) If the converted velocity v is at the slice value Slice 2 or less during the predetermined time T5, the MPU 62 judges that the head is caught in the groove 20-3 of the ramp 20 and is stopped, waits for the time T6 (see FIG. 11) for confirmation, and updates the control signal Control Signal to the voltage V3 [Volts] after the time T6 has elapsed (see times (e)→(f)→(g) in FIG. 11). Because this voltage V3 has an opposite polarity from the voltage V1, and is higher than the voltage V2, the lift 20-3 of the head (arm) 16 is pressed against the second flat face 20-4 of the groove 20-3 of the ramp 20, and the head is retracted completely. The time of applying the voltage V3 is T7, and by this, the parking position in the groove 20-3 of the lift 28 becomes constant. And the retracting processing is completed.

In this way, after the power supply failure is detected, braking is executed for the VCM and then the head 16 is moved in an opposite direction from the ramp 20. Because braking is executed, the head velocity is converted into "0", even if the seek velocity during seeking is fast. If constant voltage driving is used, the head is moved to a position opposite from the ramp 20 with a predetermined velocity with which the BEMF of the VCM 18 and the drive voltage are perfectly balanced. When the head reaches the predetermined position (inner stopper), the head contacts against the stopper and the head velocity becomes almost "0". So by detecting the state where the head velocity is close to "0", the head reaching the predetermined position is detected, and the head is unloaded by constant voltage driving in the ramp 20 direction. The head climbs over the ramp with a predetermined velocity with which the BEMF of the VCM and the drive voltage are perfectly balanced.

In this way, the head 16 reaches the inner stopper at a predetermined position in an opposite direction from the ramp 20 with a predetermined velocity after braking is executed for the VCM 18 when the power supply failure occurs, so the head can stop at the inner stopper at a predetermined position without shock, regardless of what position the head is in or regardless what velocity the head is moving. Also because of braking, the head can reach the inner stopper at a predetermined velocity in a short time, even if the seek velocity during seeking is fast. The head is unloaded from the predetermined position at a constant velocity so the head contacts the ramp and climbs onto the ramp at a predetermined velocity, which prevents damage to the head which would occur when contact force becomes excessive and the head contacts the magnetic disk with the arm inclined, therefore unloading completes with certainty. Because of this, a magnetic disk apparatus with high reliability can be implemented.

Third Embodiment

Figure 13:
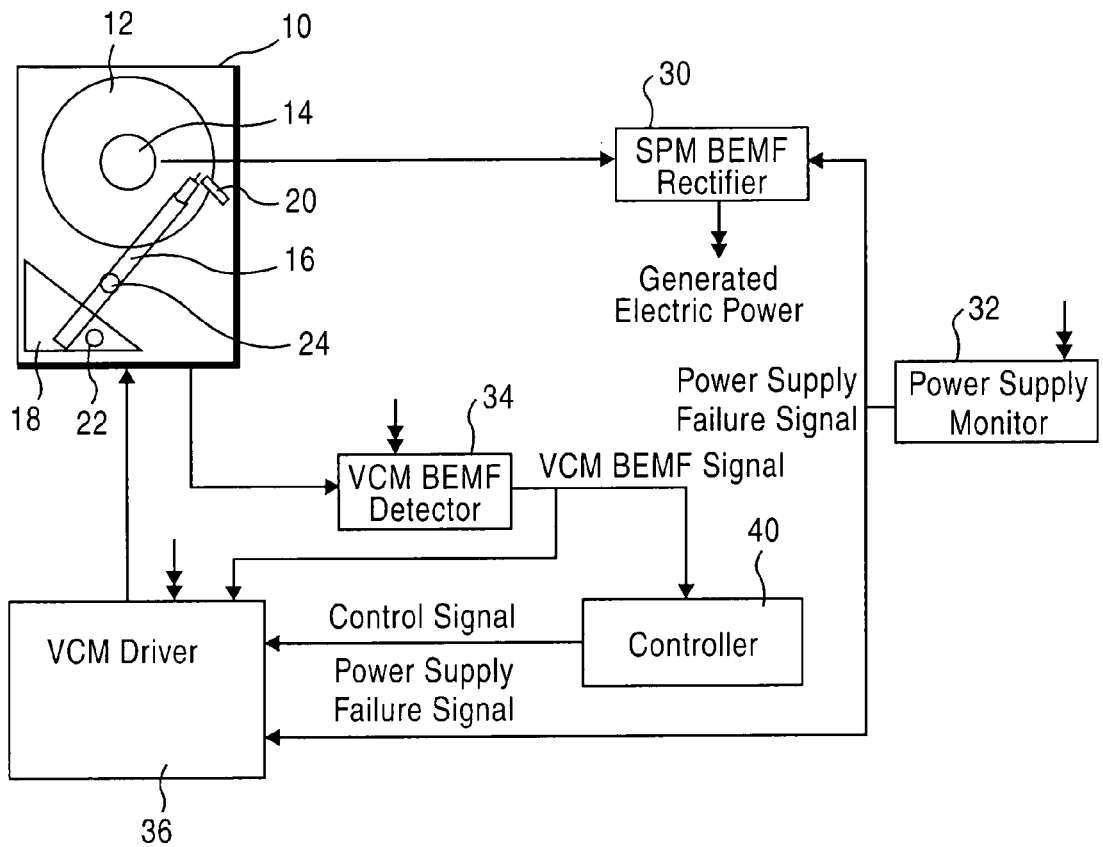
FIG. 13 is a diagram depicting the configuration of the disk apparatus according to the third embodiment of the present invention.
Figure 14:
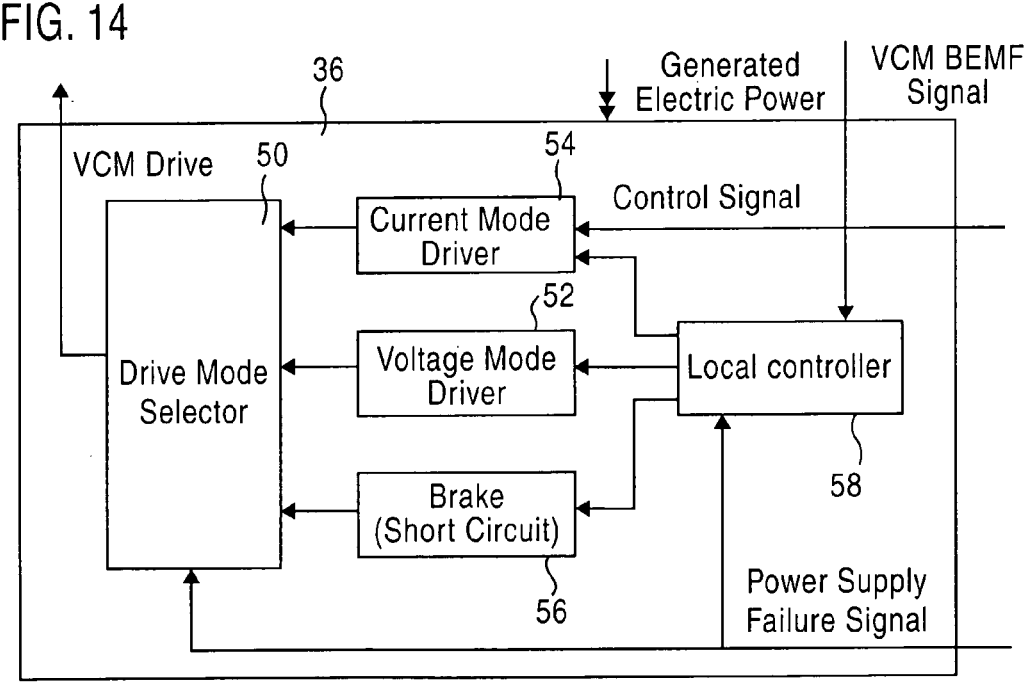
FIG. 14 is a diagram depicting the configuration of the VCM driver in FIG. 13.
Figure 15:
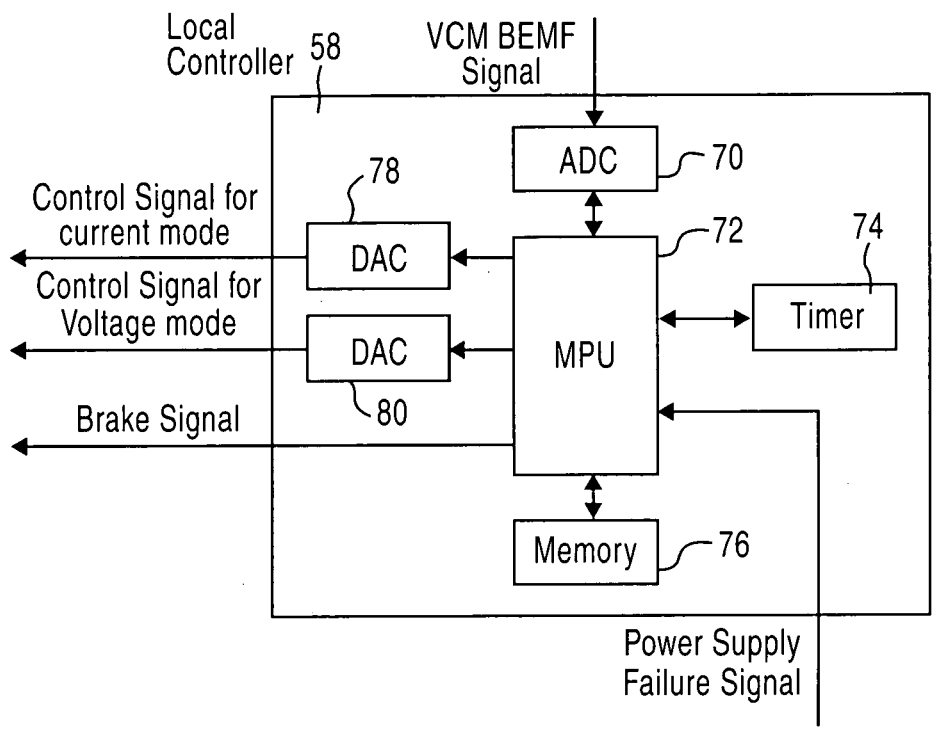
FIG. 15 is a diagram depicting the configuration of the local controller in FIG. 14.

FIG. 13 is a diagram depicting the configuration of the third embodiment of the magnetic disk apparatus of the present invention, FIG. 14 is a diagram depicting the configuration of the VCM driver in FIG. 13, and FIG. 15 is a diagram depicting the configuration of the local controller in FIG. 13.

In FIG. 13, components identical with those in FIG. 1 and FIG. 9 are denoted with identical reference numerals. In other words, as FIG. 13 shows, the magnetic disk drive 10 comprises a magnetic disk 12, a spindle motor 14 for rotating the magnetic disk 12, an arm 16 which has a head slider at the tip, a VCM (Voice Coil Motor) 18 for moving the arm 16 including the head slider in the radius direction of the magnetic disk 12, and a ramp 20 which is disposed at an outer circumference position of the magnetic disk 12 and on which the arm 16 is retracted.

The VCM 18 is comprised of a fixed magnet and a drive coil which is disposed at the rear end of the arm 16. The arm 16 is comprised of a swing arm which rotates around the rotation axis 24 as the center, and the inner stopper 22 for limiting the inner circumference position of the arm 16 is disposed on the VCM 18. The configuration of the arm 16 and the ramp 20 are the same as those shown in FIG. 3 and FIG. 4.

The power supply monitor circuit 32 monitors the power supply, and when a power supply failure is detected, the power supply monitor circuit 32 notifies the power supply failure signal POWER SUPPLY FAILURE SIGNAL to the spindle counter electromotive force rectifier 30 and the VCM driver 36. The spindle counter electromotive force rectifier 30 generates power from the counter electromotive force of the spindle motor 14 which inertia-rotates after the power supply failure occurs, and supplies the power to the power supply monitor circuit 32, VCM counter electromotive force detector 34 and VCM driver 36.

The VCM counter electromotive force detector 34 detects the counter electromotive force in proportion to the velocity from the coil of the VCM 18, and outputs it to the controller 40 and the VCM driver 36. The controller 40 outputs the control signal to the VCM driver 36, and executes seek control and track following control. The controller 40 also performs head unload processing in cases other than a power supply failure, using the counter electromotive voltage signal from the VCM counter electromotive voltage detector 34.

The VCM driver 36 drives the VCM 18 according to the instructions of the controller 40. The VCM driver 36 comprises a voltage mode driver 52, a brake (short) circuit 56, a drive mode selector 50 and local controller 58, in addition to the current mode driver 54, as shown in FIG. 14.

The current mode driver 54 and the voltage mode driver 52 output current and voltage according to the control signal (Control Signal) of the local controller 58. The brake circuit 56 shorts both ends of the VCM coil 18-1, and executes braking of the VCM 18.

The drive mode selector 50 receives the power supply failure signal POWER SUPPLY FAILURE SIGNAL, and connects either the brake circuit 56 or the voltage mode driver 52 to the VCM 18. When the power supply failure signal is not received, the current mode driver 54 drive the VCM 18 with current in normal seek control and track following control.

The local controller 58 is comprised of the AD converter 70 for converting the analog VCM counter electromotive force signal into a digital value, MPU (Micro Processor Unit) 72, timer 74, DA converters 78 and 80 for converting the digital control signals of the MPU 72 into analog control signals, and a memory 76 for storing the programs and data of the MPU 72, as shown in FIG. 15.

This embodiment is the embodiment in FIG. 9 and FIG. 10, wherein unload processing executed by the MPU 62 of the controller 40, when the power supply failure occurs, is executed by the local controller 58 disposed in the VCM driver 36. By this, the load of the controller 40 can be decreased.

Figure 16:
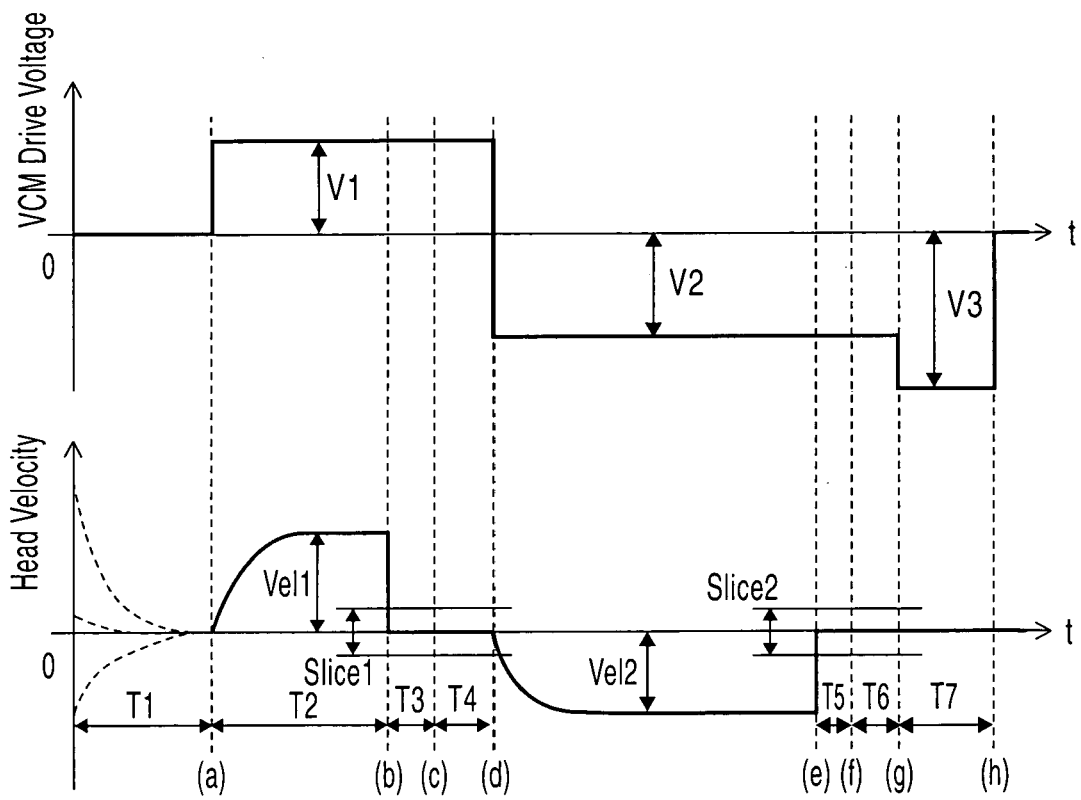
FIG. 16 is a time chart of the third embodiment of the present invention.
Figure 17:
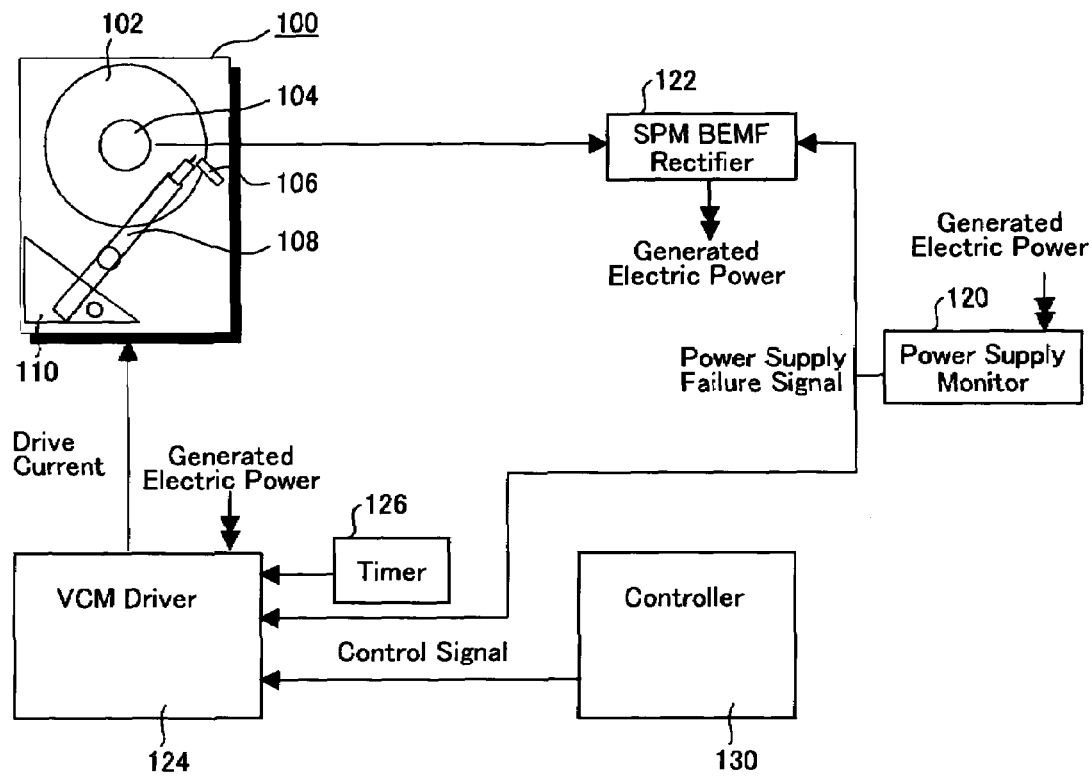
FIG. 17 is a diagram depicting a conventional magnetic disk apparatus.
Figure 18:
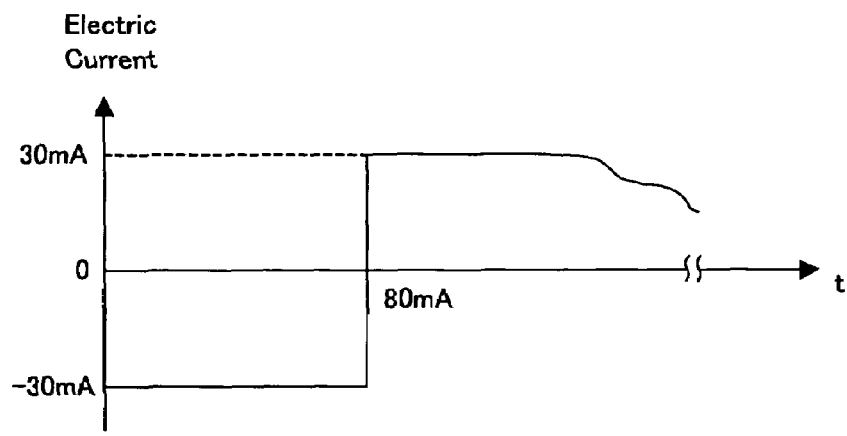
FIG. 18 is a diagram depicting a drive current of a conventional unload control.
Figure 19:
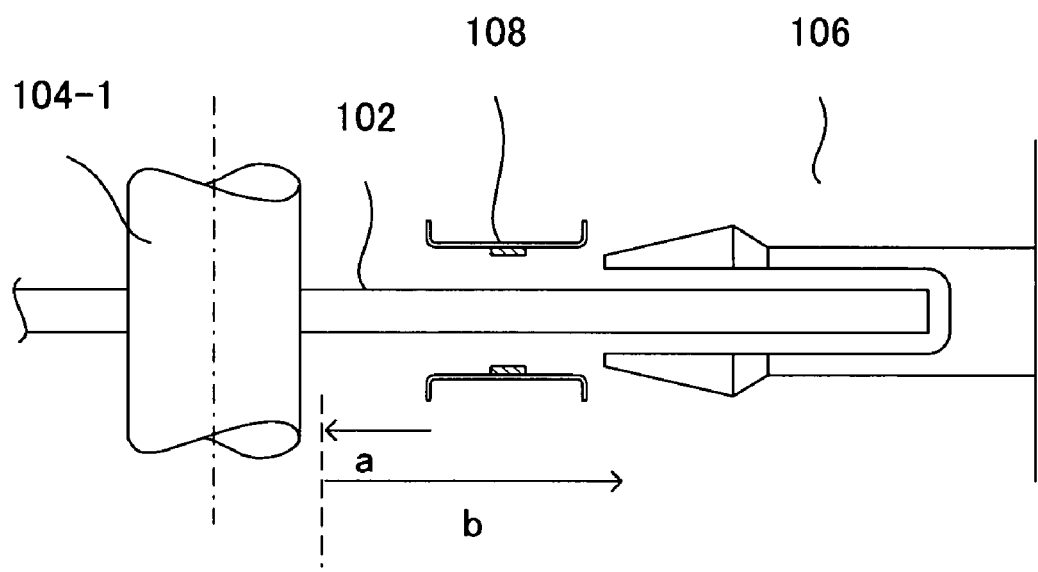
FIG. 19 is a diagram depicting a conventional unload operation.

FIG. 16 is a time chart depicting the change of VCM drive voltage and head velocity in the third embodiment. This time chart is essentially the same as the one shown in FIG. 11.

In other words, after the local controller 58 detects the power supply failure with executing the unload processing shown in FIG. 12, braking is executed for the VCM and then the head 16 is moved in an opposite direction from the ramp 20. Because breaking is executed, the head velocity is converted to "0", even if the seek velocity during seeking is fast. When constant voltage driving is used, the head is moved to a position opposite from the ramp 20 at a predetermined velocity with which the BEMF of the VCM 18 and the drive voltage are perfectly balanced. When the head reaches the predetermined position (inner stopper), the head contacts against the stopper and the head velocity becomes almost "0". So by detecting the state where the head velocity is close to "0", the head reaching the predetermined position is detected, and the head is unloaded by constant voltage driving in the ramp 20 direction. The head climbs over the ramp at a predetermined velocity with which the BEMF of the VCM and the drive voltage are perfectly balanced.

In this way, the head 16 reaches the inner stopper at a predetermined position in an opposite direction from the ramp 20 at a predetermined velocity after braking is executed for the VCM 18 when the power supply failure occurs, so the head can stop at the inner stopper at the predetermined position without shock, no matter what position the head is in or no matter what velocity the head is moving. Also because of braking, the head can reach the inner stopper at a predetermined velocity in a short time, even if the seek velocity during seeking is fast. The head is unloaded from the predetermined position at a constant velocity, so the head contacts the ramp and climbs onto the ramp at a predetermined velocity, which prevents damage to the head which would occur when contact force becomes excessive and the head contacts the magnetic disk with the arm inclined, therefore unloading completes with certainty. Because of this, a magnetic disk apparatus with high reliability can be implemented.

Other Embodiments

In the above mentioned embodiment in FIG. 14, the local controller 58 performs the unload processing in FIG. 12, but may perform unload processing of the embodiment in FIG. 7. The number of magnetic disks mounted on the magnetic disk apparatus may be one or a plurality of disks. The structure of the ramp and the structure of the lift of the arm may have a different structure.

In the unload processing in FIG. 12, brake processing is added, but brake processing may be omitted except for the case where the head velocity is detected from the VCM counter electromotive voltage when the power supply failure is detected, and the head velocity is greater than a predetermined velocity. The brake time is fixed, but the velocity of the head is detected and braking may be continued until the velocity of the head becomes a predetermined velocity or less.

The present invention has been described by the embodiments, but the present invention can be modified in various forms within the scope of the essential character of the present invention, and these shall not be excluded from the scope of the present invention.

As described above, the head reaches to the inner stopper at a predetermined position in an opposite direction from the ramp at a predetermined velocity when the power supply failure occurs, so the head can stop at the inner stopper at the predetermined position without shock, regardless what position the head is in or regardless what velocity the head is moving.

The head is unloaded from the predetermined position at a constant velocity, so the head contacts the ramp and climbs onto the ramp at a predetermined velocity, which prevents damage to the head which would occur when contact force becomes excessive and the head contacts the magnetic disk with the arm inclined, therefore unloading completes with certainty. Because of this, a magnetic disk apparatus with high reliability can be implemented.

The invention claimed is:

1. A head retracting method for retracting a head which at least reads information for an information recorded disk to a retract position according to the power supply failure, comprising:

a first step of moving-controlling said head to a predetermined position contacting a stopper in an opposite direction from said retract position such that the velocity of said head becomes constant in the vicinity of said predetermined position;

a second step of moving-controlling said head to said retract position after said head reaches said predetermined position such that the velocity of said head becomes constant in the vicinity of said retract position; and a third step of monitoring the velocity of said head after said movement control of said first step and shifting to said second step when the velocity of said head is a predetermined velocity or less for a first predetermined period of time while said head is in contact with said stopper, wherein the velocity of said head is monitored by detecting a back electromotive force of an actuator for moving said head.

2. The head retracting method according to claim 1, wherein said first step comprises a step of driving the actuator for moving said head with a predetermined first voltage so as to move the head to the predetermined position in an opposite direction from said retract position, wherein said second step comprises a step of driving said actuator with a predetermined second voltage which is different from said first voltage so as to move the head to said retract position.

3. The head retracting method according to claim 2, further comprising a step of braking the actuator by shorting both ends of the coil of the actuator for moving said head for a second predetermined time according to said power supply failure.

4. The head retracting method according to claim 1, wherein said first step comprises a step of controlling the movement of the head to a predetermined position in an opposite direction from said retract position according to said predetermined target velocity using a velocity signal fed back from velocity detection unit for detecting the moving velocity of said head, and said second step compnses a step of controlling the movement of the head to said retract position according to a scheduled target velocity using the velocity signal fed back from said velocity detection unit.

5. The head retracting method according to claim 1, further comprising a step of braking an actuator for moving said head for a second predetermined time according to said power supply failure.

6. The head retracting method according to claim 1, wherein said first step comprises a step of driving an actuator for moving said head for a second predetermined time so as to move the head to the predetermined position in an opposite direction from said retract position, and said second step comprises a step of driving said actuator for another predetermined time so as to move the head to said retract position.

7. A disk apparatus for retracting a head which at least reads information for an information recorded disk to a retract position according to the power supply failure, comprising:

an actuator for moving said head; and a control unit which moving-controls said head to move to a predetermined position contacting a stopper in an opposite direction from said retract position such that the velocity of said head becomes constant in the vicinity of said predetermined position, and moving-controls said head to said retract position after said head reaches said predetermined position such that the velocity of said head constant in the vicinity of said retract position;

wherein said control unit monitors the velocity of said head after said movement control to said predetermined position, and shifts to the movement control to said retract position when the velocity of said head is at a predetermined velocity or less for a first predetermined period of time while said head is in contact with said stopper, and wherein the velocity of said head is monitored by detecting a back electromotive force of an actuator for moving said head.

8. The disk apparatus according to claim 7, wherein said control unit drives the actuator using a predetermined first voltage so as to move the head to the predetermined position in an opposite direction from said retract position, and then drives said actuator using a predetermined second voltage which is different from said first voltage so as to move the head to said retract position.

9. The disk apparatus according to claim 7, further comprising velocity detection unit for detecting the moving velocity of said head, and wherein said control unit controls the movement of the head to the predetermined position in an opposite direction from said retract position according to said predetermined target velocity using a velocity signal fed back from said velocity detection unit and then controls the movement of the head to said retract position according to a scheduled target velocity using the velocity signal fed back from said velocity detection unit.

10. The disk apparatus according to claim 7, wherein said control unit brakes the actuator for moving said head for a second predetermined time according to said power supply failure.

11. The disk apparatus according to claim 10, wherein said control unit brakes the actuator by shorting both ends of the coil of the actuator for moving said head for the second predetermined time according to said power supply failure.

12. The disk apparatus according to claim 7, wherein said control unit controls the movement of the head to a predetermined position in an opposite direction from said storage position by driving the actuator for moving said head for a second predetermined time, and then controls the movement of the head to said retract position by driving said actuator for a third predetermined time.

13. The disk apparatus according to claim 7, further comprising a ramp for parking said head at said retract position.

14. A head actuator control circuit for retracting a head which at least reads information for an information recorded disk to a retract position according to the power supply failure, comprising:

a power monitoring circuit for detecting said power supply failure; and an actuator control circuit which moving-controls said head to a predetermined position contacting a stopper in an opposite direction from said retract position such that a velocity of said head becomes constant in the vicinity of said predetermined position according to the power supply failure detection of said power supply monitoring circuit, and then moving-controls said head to said retract position after said head reaches said predetermined position such that the velocity of said head moving to said retract position becomes constant in the vicinity of said retract position, wherein said control unit monitors the velocity of said head after control of movement to said predetermined position is performed, and shifts to the control of movement to said retract position when the velocity of said head is at a predetermined velocity or less for a first predetermined period of time while said head is in contact with said stopper, and wherein the velocity of said head is monitored by detecting a back electromotive force of an actuator for moving said head.

15. The head actuator control circuit according to claim 14, wherein said actuator control circuit comprises:

a voltage mode driver; and a controller for controlling said voltage mode driver to drive the actuator for moving said head using a predetermined first voltage so as to move the head to a predetermined position in an opposite direction of said retract position, and then to drive said actuator using a predetermined second voltage which is different from said first voltage so as to move the head to said retract position.

16. The head actuator control circuit according to claim 14, wherein said actuator control circuit comprises:

velocity detection unit for detecting the moving velocity of said head; and a controller which controls the movement of the head to a predetermined position in an opposite direction of said retract position according to said predetermined target velocity using a velocity signal fed back from said velocity detection unit, and then controls the movement of the head to said retract position according to a scheduled target velocity using the velocity signal fed back from said velocity detection unit.

17. The head actuator control circuit according to claim 14, further comprising a brake circuit for braking the actuator for moving said head for a second predetermined time according to said power supply failure.

18. The head actuator control circuit according to claim 17, wherein said brake circuit comprises a circuit for shorting both ends of the coil of the actuator for moving said head for the second predetermined time according to said power supply failure.

19. The head actuator control circuit according to claim 14, wherein said control unit controls the movement of the head to a predetermined position in an opposite direction from said retract position by driving the actuator for moving said head for a second predetermined time, then controls the movement of the head to said retract position by driving said actuator for a third predetermined time.

* * * * *